(12) United States Patent
Le Roux

(10) Patent No.: US 11,277,776 B2
(45) Date of Patent: Mar. 15, 2022

(54) METHOD FOR DETERMINING ELIGIBILITY FOR A HANDOVER FOR A NODE IN A DISTRIBUTED NETWORK

(71) Applicant: SAGEMCOM BROADBAND SAS, Rueil Malmaison (FR)

(72) Inventor: Sylvain Le Roux, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 0 days.

(21) Appl. No.: 16/536,772

(22) Filed: Aug. 9, 2019

(65) Prior Publication Data
US 2020/0107231 A1 Apr. 2, 2020

(30) Foreign Application Priority Data
Sep. 28, 2018 (FR) ...................................... 18/59006

(51) Int. Cl.
*H04W 36/00* (2009.01)

(52) U.S. Cl.
CPC ... *H04W 36/0058* (2018.08); *H04W 36/0085* (2018.08)

(58) Field of Classification Search
None
See application file for complete search history.

(56) References Cited

U.S. PATENT DOCUMENTS

| | | | |
|---|---|---|---|
| 8,089,939 B1 | 1/2012 | Mater et al. | |
| 9,538,446 B1 | 1/2017 | Kaushik | |
| 2006/0153133 A1* | 7/2006 | Zhong | H04W 36/0061 370/331 |
| 2010/0056157 A1 | 3/2010 | Verona et al. | |
| 2016/0066301 A1 | 3/2016 | Zhu et al. | |
| 2018/0084471 A1 | 3/2018 | Emmanuel et al. | |
| 2018/0295548 A1* | 10/2018 | Kumar | H04W 36/0083 |
| 2019/0116501 A1* | 4/2019 | Huang | H04W 8/22 |

OTHER PUBLICATIONS

Apr. 15, 2019 Search Report issued in French Patent Application No. 18/59006.

* cited by examiner

*Primary Examiner* — Kouroush Mohebbi
(74) *Attorney, Agent, or Firm* — Oliff PLC; R. Brian Drozd

(57) ABSTRACT

A method for determining eligibility for a handover of a client node of a distributed communication network that includes a plurality of gathering nodes. The client node is associated with one level among a plurality of levels. The method includes determining a connection quality indicator and determining a connection quality threshold dependent on the level. If the connection quality indicator compared with the threshold indicates a poor relative quality of the connection then incrementing the level or executing a handover method, otherwise if, and as long as, the connection quality indicator compared with a threshold determined according to the level immediately below the level associated with the client node indicates a better connection quality, then decrementing the level.

8 Claims, 4 Drawing Sheets

METHOD FOR DETERMINING ELIGIBILITY FOR A HANDOVER FOR A NODE IN A DISTRIBUTED NETWORK

The present invention relates to the field of wireless communication networks conforming to one of the IEEE 802.11 (Institute of Electrical and Electronics Engineers) standards, that is to say wireless communication networks commonly referred to as Wi-Fi networks. The present invention relates more particularly to a method for determining eligibility for a connection transfer of a client node of a distributed communication network.

A wireless communication network (hereinafter "network") in accordance with one of the IEEE 802.11 standards typically comprises a plurality of nodes. Each node is an electronic device comprising at a minimum a radio-frequency module allowing the establishment of communications in accordance with one of the IEEE 802.11 standards, or in other words in accordance with one of the Wi-Fi standards. Such a network typically comprises a node or electronic device known as a master, commonly referred to as the access point or AP, and a plurality of nodes or electronic devices known as users (or clients) able to establish wireless connections with the access point and/or with each other. In a residential environment, the master electronic device, or access point, is typically a box supplied by an internet operator, that is to say a home gateway or residential gateway. The user electronic devices are typically computers, televisions, tablets or so-called smartphones. It is also commonly said that the user electronic devices are associated or connected "by Wi-Fi" with the access point.

The architecture of a Wi-Fi network may also be a so-called distributed architecture, in order for example to extend the range of the wireless network or to increase its performance, by the use of a plurality of access points. The architecture of a distributed Wi-Fi network typically comprises two networks:
- a first so-called backhaul network making it possible to connect the access points to each other and to form a network infrastructure in accordance with a network architecture of the star and/or chain mixed type, this gathering network being able to be a wireless network (for example Wi-Fi), a cabled network (for example Ethernet) or a mixture of the two,
- a second so-called fronthaul network allowing a wireless connection of so-called user nodes (or electronic devices) (or clients, or stations) to the distributed Wi-Fi network.

Figure 1:
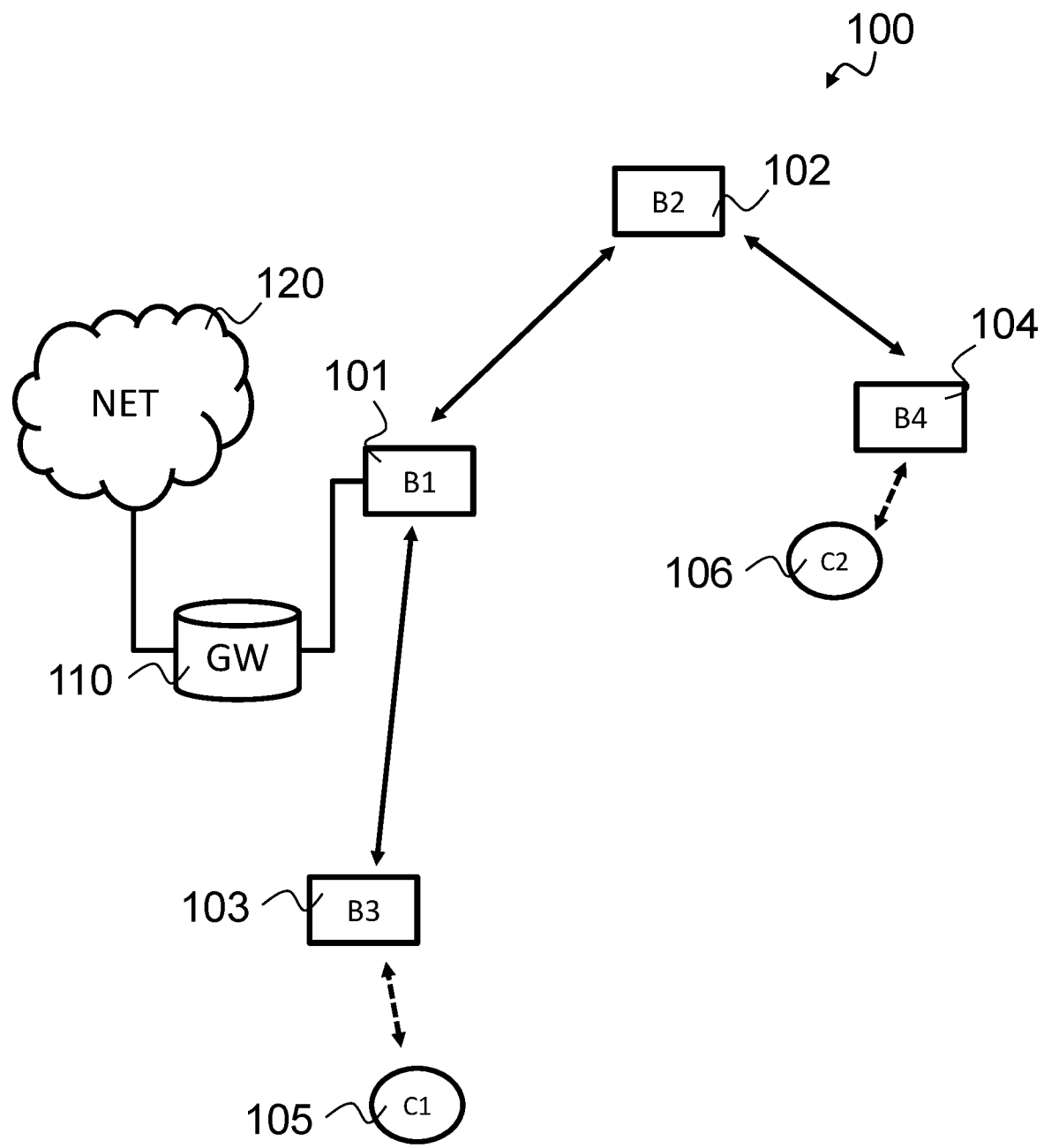

FIG. 1 illustrates highly schematically such a distributed Wi-Fi network 100. The distributed wireless communication network 100 (hereinafter "network 100") comprises a gateway 110 and a plurality of nodes or electronic devices B1 101, B2 102, B3 103, B4 104, C1 105 and C2 106. The gateway 110 affords interconnection of the network 100 with a network 120, for example the internet. In this example, the nodes B1, B2, B3 and B4 are so-called gathering nodes. These nodes B1, B2, B3 and B4 constitute the backhaul of the network 100. The nodes C1 and C2 are two client nodes connected to gathering nodes (respectively the nodes B3 and B4). The gathering nodes B1, B2, B3 and B4 typically manage two Wi-Fi networks:
- a first Wi-Fi network, dedicated to gathering, affords connection of each gathering node to the distributed network 100, possibly in a concatenated fashion,
- a second Wi-Fi network is dedicated to the connection of the client nodes to one or other of the gathering nodes, in a similar fashion to a non-distributed Wi-Fi network.

In the example illustrated in FIG. 1, the node B1 101 is connected by a cable to the gateway GW 110, for example via an Ethernet connection. According to one embodiment, the connection between the gateway GW 110 and the node B1 101 can be achieved by a Wi-Fi connection. According to one embodiment, the gateway GW 110 and the node B1 101 are one and the same electronic device, said electronic node comprising the functionalities of the gateway GW 110 and of the node B1 101.

Each gathering node B1, B2, B3 or B4 can therefore possibly establish a connection to another gathering node in order to constitute the gathering infrastructure of the distributed network 100. It should be noted that, according to one embodiment, some gathering nodes may be connected via a cable connection, for example of the Ethernet type, to the infrastructure network.

A user node, such as the user node C1 or the user node C2, can therefore potentially establish a wireless connection with one or other of the gathering nodes B1, B2, B3 or B4. Typically, a client node seeks to establish a wireless connection with the gathering node that transmits the strongest radio signal. In other words, a client node seeks to establish a wireless connection with a gathering node from the plurality of gathering nodes available, the chosen gathering node corresponding to the gathering node the radio signal of which is received with the strongest power by the client node.

This choice is not always the optimum choice from the point of view of the distributed communication network. This is because the gathering node chosen by a client node for connecting may certainly be the one offering the best quality of reception of the radio signal, but this gathering node may moreover be overloaded in terms of number of client nodes already connected or gathering traffic passing through this node. It could be optimum in this case for the client node to connect to another less loaded gathering node even if the latter in principle offers less good quality of radio signal.

More prosaically, the client node is the only decider on the gathering node used to connect to the network, and it is not possible to establish, for a distributed wireless communication network, a centralised strategy for connection of the client nodes to the various gathering nodes.

The French patent application 18/55829 filed on 28 Jun. 2018 in the name of SAGEMCOM BROADBAND SAS discloses a solution for overcoming this lack of functionality of the "transfer of connection" or "handover" type in a Wi-Fi communication network. The solution disclosed makes it possible to determine if it is pertinent to transfer a connection of a client node established with a first gathering node to another gathering node. If such is the case, the solution discloses a method for selecting another gathering node more suited to the connection of the client node, according to a variety of criteria not limited solely to the power of the radio signal received. Finally, the solution disclosed makes it possible to achieve the transfer of the connection between the client node and the first gathering node to a second gathering node.

The solution disclosed in the patent application comprises a plurality of embodiments, the various embodiments being suited to the functionalities of the client nodes. Thus, according to an embodiment disclosed in the patent application cited, or more precisely in the description of FIG. 2, the solution describes a method suited in particular to client nodes not compatible with or conforming to the IEEE 802.11k and/or IEEE 802.11v standards. In this particular case, for a client node connected to a first gathering node, the method comprises the principal steps of:

calculating a quality indicator, referred to as "ScoreStation", associated with the client node, and, if this quality indicator reveals a poor quality of connection with the first gathering node (a predetermined threshold exceeded), then the solution disclosed allows the temporary blocking of the connection between the client node and the first gathering node (cf. description of step 205 of the patent application cited), which then forces the client node to connect to another gathering node (cf. description of step 206 of the patent application cited).

This solution makes it possible to introduce a concept of "handover" in a Wi-Fi communication network, even for client nodes not conforming to the IEEE 802.11k and/or IEEE 802.11v standards.

However, if the client node is in a situation where it can connect only to the first gathering node, or if this first gathering node is in the end the gathering node making it possible to obtain the best quality of connection with the client node, then the method disclosed in the patent application cited causes very great instability of the connection between the client node and the first gathering node, this connection then being interrupted or degraded at each blocking of the connection with the first gathering node. The blocking being able to be triggered at each iteration of the method for managing the connection of the client node if the quality indicator associated with the client node remains an indicator of a poor quality of connection, as defined by a predefined threshold.

It is therefore necessary to propose a method for overcoming these drawbacks.

The invention relates to a method for determining eligibility for a handover of a client node of a distributed communication network comprising a plurality of gathering nodes, the client node being connected to a first gathering node, the client node being associated with one level among a plurality of levels, the method being executed by a so-called management node and comprising the iterative steps of:

determining a connection quality indicator associated with the client node, the connection quality indicator representing a quality of the connection between the first gathering node and the client node, determining, according to the level associated with the client node, a connection quality threshold, said threshold being a better indicator of a good connection quality, the lower the level associated with the client node, if the connection quality indicator compared with the threshold indicates a poor relative quality of the connection, then:

incrementing the level associated with the client node, executing steps of a method for handover of the client node, or, if the connection quality indicator compared with the threshold indicates a relatively good quality of the connection, then:

if, and as long as, the connection quality indicator compared with a threshold determined according to the level immediately below the level associated with the client node indicates a better connection quality, then: decrementing the level associated with the client node.

According to a complementary embodiment of the invention, if the connection quality indicator compared with the threshold indicates a good relative quality of the connection, then the connection quality indicator is compared with a threshold determined according to the level immediately below the level associated with the client node, a threshold to which a predefined margin is added.

According to a complementary embodiment of the invention, a level associated with a client node is a strictly positive natural integer.

According to a complementary embodiment of the invention, all the thresholds determined according to the levels associated with a client node constitute an arithmetic or geometric series.

According to a complementary embodiment of the invention, the difference between two consecutive connection quality thresholds determined according to the levels of a client node is greater than the variability of the connection quality indicator associated with the client node in a static position.

According to a complementary embodiment of the invention, the difference between two consecutive connection quality thresholds determined according to the levels of a client node is greater than four times the variability of the connection quality indicator associated with the client node in a static position.

According to a complementary embodiment of the invention, the so-called management node is one of the gathering nodes of the distributed communication network.

According to a complementary embodiment of the invention, the communication network is a distributed wireless communication network conforming to an IEEE 802.11 standard.

The invention also relates to a node for managing a distributed wireless communication network, the communication network comprising a plurality of gathering nodes, the gathering node being suitable for executing the steps of the method for determining eligibility for handover of a client node described in the present document.

The invention also relates to a computer program that can be stored on a medium and/or downloaded from a communication network, in order to be read by a processor of a management node of a distributed wireless communication network. This computer program comprises instructions for implementing all or some of the steps of the method for determining eligibility for handover for a client node, when said program is executed by the processor.

The invention also relates to an information storage medium or recording medium that can be read by or is accessible to the management node of the distributed wireless communication network, the information storage medium or recording medium comprising such a computer program.

Figure 2:
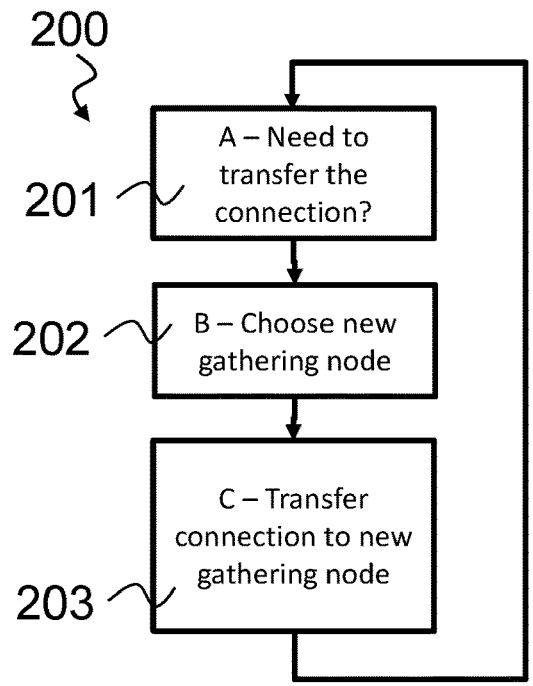
Figure 3:
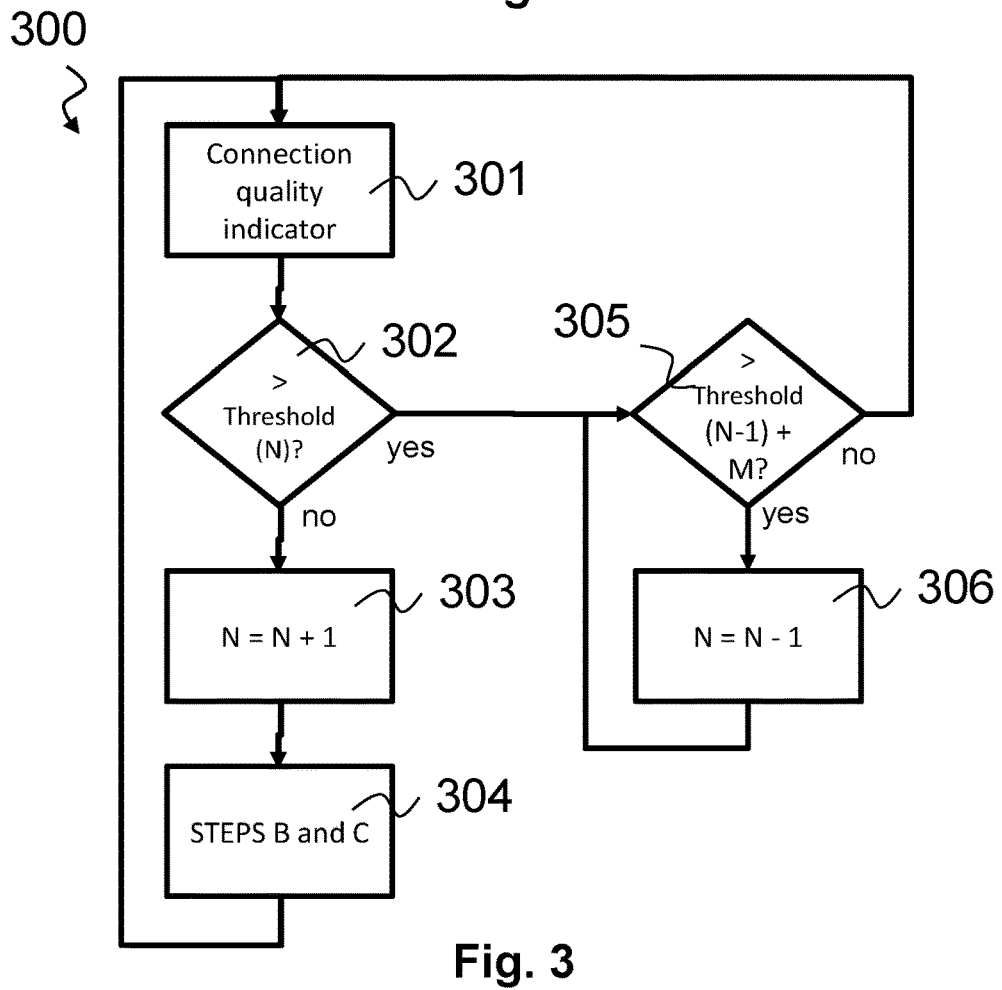
Figure 4:
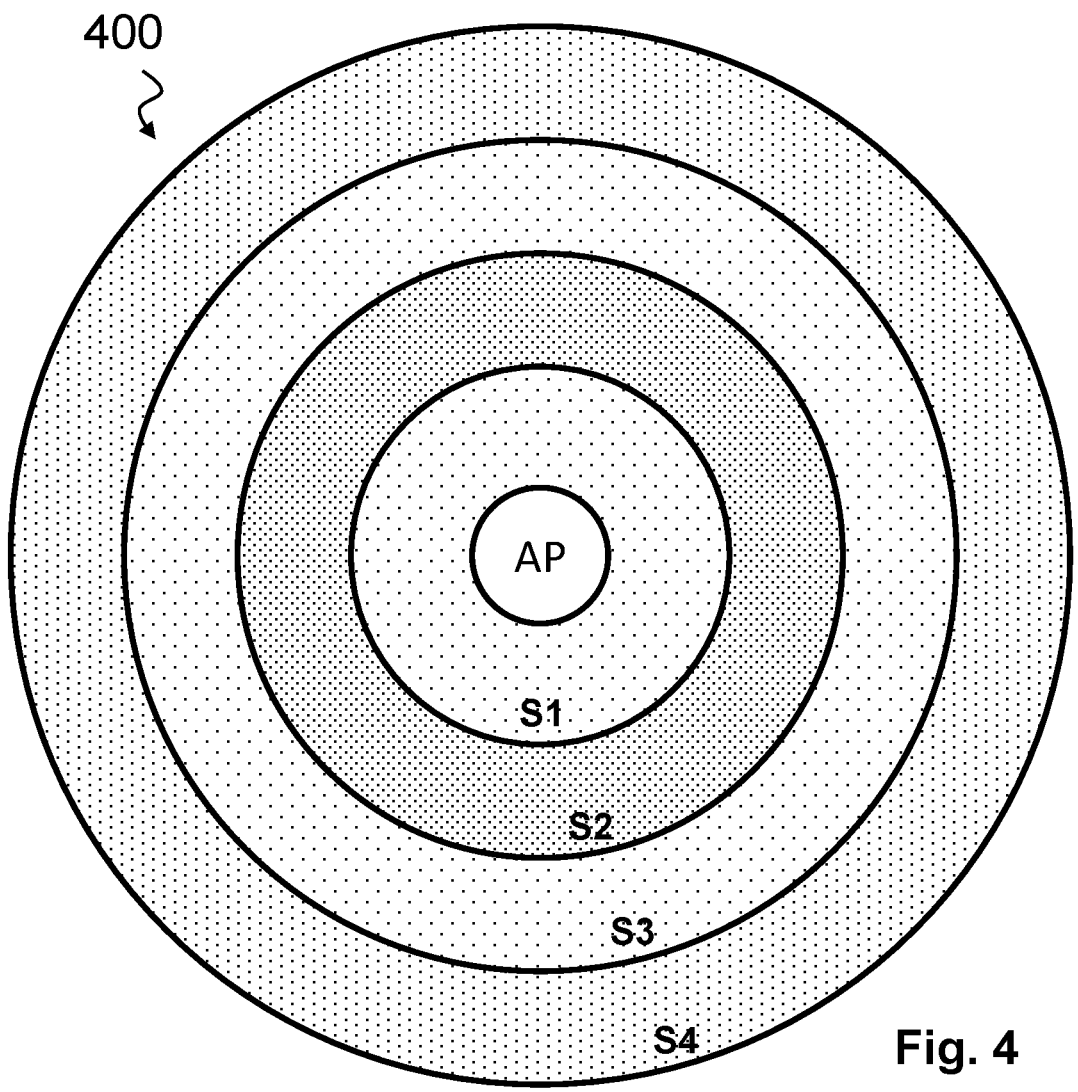
Figure 5:
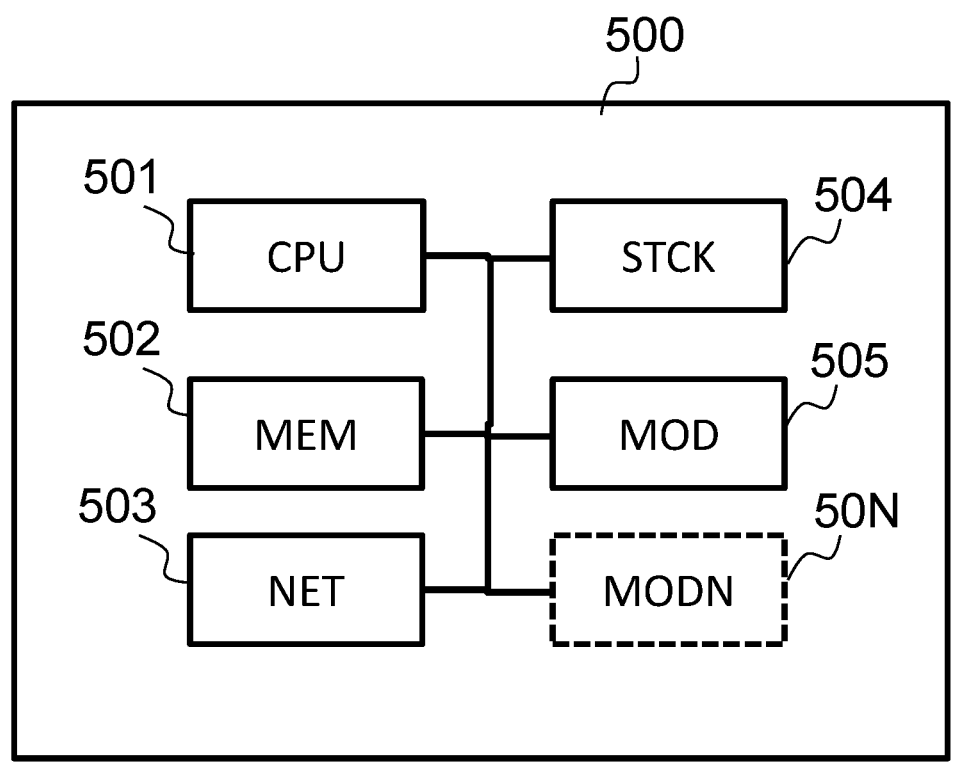

The features of the invention mentioned above, as well as others, will emerge more clearly from a reading of the following description of an example embodiment, said description being given in relation to the accompanying drawings, among which:

FIG. 1 illustrates schematically the architecture of a distributed wireless communication network comprising a plurality of nodes, for example conforming to an IEEE 802.11 standard, FIG. 2 illustrates schematically the main steps of a method for managing a connection of a client node to a distributed wireless communication network, FIG. 3 illustrates schematically a method for determining eligibility for a handover for a client node connected to a gathering node of a distributed wireless communication network, FIG. 4 illustrates schematically a theoretical representation of level zones defined for a plurality of eligibility thresholds according to an embodiment of the invention, FIG. 5 illustrates schematically the hardware architecture of an electronic device or management node of a distributed wireless communication network, the electronic device or management node being suitable for executing all or some of the steps of the method for determining eligibility for a handover for a client node connected to a gathering node of a distributed wireless communication network, according to the embodiment illustrated in FIG. 3.

The invention advantageously improves the method disclosed in the French patent application no. 18/55829 filed on 28 Jun. 2018 (hereinafter "previous patent application"). The invention in particular makes it possible to avoid connection breaks for client nodes not supporting the IEEE 802.11k and/or IEEE 802.11v standards (cf. the method 200 disclosed in French patent application no. 18/55829 filed on 28 Jun. 2018, pages 7 to 13, more specifically the description of steps 205 and 206). The method that is the subject matter of the invention thus makes it possible to avoid unduly and repetitively forcing a handover from a connected client node to a gathering node by blocking of the connection by the gathering node. This is because, in the method disclosed in the French patent application cited, the client node is possibly cut off from the communication network throughout the time of blacklisting by the gathering node, which may prove to be the only one to be able to connect the client node to the communication network.

However, advantageously, the invention relates to a method suitable both for client nodes conforming to an IEEE 802.11k and/or IEEE 802.11v standard and for nodes not conforming to these two standards.

In the methods 200 and 300 illustrated hereinafter in FIG. 2 and FIG. 3, the network 100 comprises a so-called management node. The functions of said management node may be integrated in one of the gathering nodes of the network 100, for example the so-called central node B1 101, or be integrated in a dedicated electronic device of the network 100. According to another embodiment of the invention, these functions may be integrated in the gateway 110.

FIG. 2 illustrates schematically the main steps of a method 200 for managing a connection of a client node to a distributed wireless communication network, for example the communication network 100.

The method 200 is executed by a management node of the network 100, the management node possibly being one or other of the gathering nodes of the network 100. Possibly, each gathering node may adopt the role of management node. The network 100 may then comprise a method for determining which of the gathering nodes must adopt the role of management node.

The method 200 is possibly executed periodically for each of the connections of the client node of the network 100 in order to regularly check that it is necessary to transfer an existing connection of a client node to a gathering node to another gathering node. Alternatively or in a complementary manner, the method 200 may be triggered by a predetermined event, for example when a new client node is connected to the network, when a gathering node determines that it is overloaded, etc.

The first step 201 corresponds to the determination of the opportunity to transfer the connection of a client node connected to a gathering node of the network. Conventionally, and as disclosed in the previous patent application (cf. description of steps 202 and 302), an indicator of the quality of the connection between the client node and the gathering node is determined and then compared with a predetermined threshold. If the comparison indicates that the connection quality is, compared with the threshold, good, then there is no need to transfer the connection to possibly another gathering node. In the contrary case, then the management node considers that the current connection quality is unsatisfactory and that the connection of the client node should be transferred to another gathering node in order to benefit from a better connection quality.

In the latter case, the method passes to step 202 of determining a possible new gathering node that would make it possible to obtain a better connection quality (description of steps 207, 208 and 209 or 305, 306, 307, 308 and 309 of the previous application).

Once a better gathering node has been determined, the handover method, in a step 203, proceeds with the transfer of the connection from the old gathering node to the new gathering node.

Sometimes steps 202 and 203 are integrated in a single step. This is because, as seen previously, for example for client nodes not conforming to an IEEE 802.11k and/or IEEE 802.11v standard, it is technically difficult to determine a gathering node that would make it possible to offer a better connection quality. It is then possible to temporarily block the connection between the client node and the gathering node in order to force the client node to itself proceed with the selection of a better gathering node. If the client node cannot select a better gathering node in order to establish a new connection, then the client node may be temporarily cut off from the communication network.

Since steps 201, 202 and 203 may be periodically repeated, a client node not conforming to an IEEE 802.11k and/or IEEE 802.11v standard may be cut off from the communication network very regularly. This is because, if at each step 201 the management node considers that the connection must be transferred whereas the client node is already connected to the only possible gathering node, then the client node will be cut off from the network temporarily at each iteration of the method.

The method described below in FIG. 3 corresponds to a method for determining eligibility for a handover for a client node of a distributed network, a method that may correspond to step 202 of FIG. 2.

Each gathering node of the network 100 may be connected to a communication bus, for example a software communication bus protected as described in the patent application WO 2013/087894 A1 published on 20 Jun. 2013. Thus the gathering nodes may periodically exchange the connection quality data collected by each gathering node and form a distributed database or one replicated by each gathering node comprising, for each gathering node, all the quality data collected.

FIG. 3 illustrates schematically a method 300 for determining eligibility for a handover for a client node connected to a gathering node of a distributed wireless communication network 100. The network 100 comprises a plurality of gathering nodes. Each client node is connected to a gathering node. Each client node is associated with one level from a plurality of levels. This level is associated with a client node and may vary dynamically according to the method described below. A level associated with a client node may be kept by the client node after disconnection of a gathering node. The method 300 is executed by a so-called management node of the network 100, possibly one of the gathering nodes.

In a first step 301, a management node of the network 100 determines a connection quality indicator "ScoreStation" associated with the client node, the connection quality indicator representing a quality of the connection between the first gathering node and the client node.

The management node can determine a connection quality indicator associated with a client node connected to a first gathering node, the connection quality indicator representing a quality of the connection between the first gathering node and the client node. In other words, the management node, for each connection established in the network 100, or on a selection of these connections, determines a quality indicator associated with the connection. This quality indicator, referred to as "ScoreStation", can be determined in accordance with the following formula for a given connection:

ScoreStation=coef1×RSSI+coef2×PhyRate, with:

"ScoreStation": quality indicator for a connection between a client node and a gathering node,
"coef1": first weighting coefficient,
"coef2": second weighting coefficient,
"RSSI": reception power of a radio signal transmitted by the client node and received by the first gathering node,
"PhyRate": low-level transmission rate of the connection.

According to one embodiment of the invention, the weighting coefficients "coef1" and "coef2" may be predetermined. According to another embodiment of the invention, the weighting coefficients "coef2" and "coef2" are determined by the formulae:

(1) if the connection is active, that is to say the client node exchanges data with the gathering node, then the quality data "airTimeUsage" is positive and:

Coef1=Coef2=PhyRateThreshold/RSSIThreshold, with:

"PhyRateThreshold": predetermined value of the low-level transmission rate of the connection, typically chosen in the range [26; 52],
"RSSIThreshold": predetermined value of the reception power of a radio signal transmitted by the client node and received by the first gathering node, typically chosen in the range [−80; −65].

(2) if the connection is inactive, that is to say when the client node does not exchange data with the gathering node (in other words, the client node is "asleep"), then the quality data "airTimeUsage" is zero and:

Coef1=1/RSSIThreshold, and,

Coef2=0.

The weighting of the coefficients Coef1 and Coef2 makes it possible to cover the cases where the client node is active or asleep.

The parameter "RSSIThreshold" being here chosen from a range of negative values, the coefficients "Coef1" and "Coef2" are therefore negative. Thus a degradation of the connection quality results in an increase in the quality indicator "ScoreStation".

According to the embodiment of the invention, the quality indicator "ScoreStation" is chosen equal to "RSSI". In this case, a degradation of the connection quality results in a decrease in the quality indicator "ScoreStation".

Thus, in the remainder of the description, according to the definition of the quality indicator chosen, a connection quality indicator higher than a quality threshold can indicate either a better connection quality or a less good connection quality. A person skilled in the art knows how to adapt the comparisons between the quality indicator and the thresholds according to the definition of the quality indicator used and the result sought. Hereinafter, we adopt as a convention that the connection indicator increases when the connection quality improves.

In a following step 302, the management node determines, according to the level associated with the client node, a connection quality threshold, said threshold being a better indicator of a good connection quality, the lower the level associated with the client node. In other words, the management node determines, for each client node, and according to the level associated with said client node, a quality threshold. This quality threshold makes it possible to define a limit value between an acceptable connection quality ("no handover necessary") and an unacceptable connection quality ("it may be useful to see whether a transfer could improve the situation"). The threshold is determined according to the level associated with each client node.

According to one embodiment of the invention, a level is a strictly positive natural integer. By default, before the execution of the steps of the present method, each client node is associated with the level 1, which is then associated with a quality threshold indicating the best connection quality. The other levels (2, 3, etc.) are associated with thresholds comparatively associated with lower connection qualities, and this in a decreasing manner. The level with which each client node is associated can be kept even after its connection with a gathering node is broken. The same level is used whatever the gathering node to which the client node is connected.

Thus, according to one embodiment of the invention, all the thresholds determined according to the levels associated with a client node constitute an arithmetic series. For example:

$S(n)=S_1+(n-1)\cdot R$, with:

"n": level associated with a client node, "n" being a strictly positive integer,
"S(n)": threshold associated with the level "n" for a client node,
"$S_1$": reference threshold, associated with the level "1", for example −60 dBm,
"R": parameter defining the difference between two consecutive thresholds, for example −15 dBm.

According to another embodiment of the invention, all the thresholds determined according to the levels associated with a client node constitute a geometric series. For example:

$S(n)=S_1 \cdot q^n$, with:

"n": level associated with a client node, "n" being a strictly positive integer,
"S(n)": threshold associated with the level "n" for a client node,
"$S_1$": reference threshold, associated with the level "1", for example −60 dBm,
"q": common ratio of the series, for example "1.2"

According to another embodiment of the invention, all the thresholds determined according to the levels associated with a client node may constitute any type of mathematical series or arbitrary arrangement of values provided that all the thresholds constitute an ordered list of values. Thus a threshold may be determined according to a level by means of a mathematical function or by finding a value associated with a level in a predefined list of values.

During this same step 302, once the threshold has been determined, the management node compares the quality indicator determined and the threshold.

If the connection quality indicator compared with the threshold indicates a poor relative quality of the connection, then the management node passes to step 303.

If the connection quality indicator compared with the threshold indicates a good relative quality of the connection, then the management node passes to step 305.

In other words, on the assumption that the better the connection quality, the higher the quality indicator, then:
- if the quality indicator is higher than the threshold, then the management node passes to step 305,
- otherwise, if the quality indicator is below the threshold, then the management node passes to step 303.

In step 303, the management node increments the level associated with the client node. This has the effect of associating with the client node a quality threshold that is less constraining in terms of quality. The management node then passes to step 304.

In step 304, the management node executes the steps of a method of transferring the connection of the client node. In other words, the management node performs the known step of managing transfer of the connection of the client node, as for example described in the previous patent application. These steps may comprise a first step of selecting a gathering node and then a step of transferring the connection. According to the embodiment of the invention, this step 304 may comprise a step of temporary blocking of the connection between the client node and the gathering node. Should the gathering node be the only one to be able to connect the client node, repetition of steps 301, 302, 303 and 304 ultimately leads to a situation where the incrementation of the level associated with the client node means that the threshold is finally less constraining than the current quality of the connection, which ends the breaks in the connection by blocking of the gathering node. The present solution converges towards a situation avoiding interruptions of services of the client node and makes it possible to stabilise the connection to the network 100.

During steps 305 and 306, the management node decrements the level associated with the client node if, and as long as, the connection quality indicator compared with a threshold determined according to the level immediately below the level associated with the client node indicates a better connection quality.

In other words, in step 305, the management node compares the quality indicator determined during step 301 with the threshold determined according to the level lower than the current level. Thus, if during the implementation of step 305 the level associated with the client node is n, then the management node compares the quality indicator with "S(n−1)".

According to the embodiment of the invention, the management node compares 20 the quality indicator with a modified threshold equal to:

$$S(n-1)+M, \text{ with}$$

"S(n−1)": threshold determined according to the level "n−1",

"M": predefined margin.

The margin M makes it possible to avoid phenomena of oscillation in the case where the quality indicator is close to a threshold, the variability in the measurement of the quality indicator then being able to switch the indicator from one side of the threshold to the other.

If the quality indicator is above the threshold "S(n−1)" or the modified threshold "S(n−1)+M", according to the implementation of the invention, then, as long as the level is strictly greater than 1, the level associated with the client node is decremented in a step 306: n→n−1.

If the quality indicator is below the threshold value "S(n−1)" or the modified threshold value "S(n−1)+M", according to the implementation of the invention, or the level passes to 1, then the management node can resume an iteration of the method 300 starting from step 301. The level associated with the client node is kept from one iteration to another.

According to one embodiment of the invention, the difference between two consecutive connection quality thresholds determined according to the levels of a client node (for example S(n) and S(n+1)) is greater than the variability in the connection quality indicator associated with the client node in a static position. In other words, in order to avoid oscillation phenomena, the difference in value between two thresholds must make it possible to take into account the natural variability of a quality indicator of a static client node, or one at least remaining approximately at the same position. Thus the difference between two consecutive connection quality thresholds determined according to the levels of a client node is advantageously greater than four times the variability of the connection quality indicator associated with the client node in a static position.

According to one embodiment of the invention, the so-called management node is one of the gathering nodes of the distributed communication network.

According to one embodiment of the invention, the communication network is a distributed wireless communication network according to an IEEE 802.11 standard.

FIG. 4 illustrates schematically a theoretical representation of level zones defined by a plurality of eligibility thresholds according to one embodiment of the invention.

Thus "AP" represents the gathering node of the network 100.

The zone "S1" represents a zone for which the quality indicator of a client node situated in this zone would be greater than the threshold value S1.

The zone "S2" represents a zone for which the quality indicator of a client node situated in this zone would be greater than the threshold value S2, but less than S1.

The zone "S3" represents a zone for which the quality indicator of a client node situated in this zone would be greater than the threshold value S3, but less than S2, and so on.

FIG. 5 illustrates schematically the hardware architecture of an electronic device or management node 500 of a distributed wireless communication network, the electronic device or management node 500 being suitable for executing all or some of the steps of the method for determining eligibility for a handover for a client node connected to a gathering node of a distributed wireless communication network, according to the embodiment illustrated in FIG. 3. The management node 500 may be one of the gathering nodes B1, B2, B3, B4 or B5 illustrated in FIG. 1.

Thus the electronic device 500 comprises, connected by a communication bus: a processor or CPU (central processing unit) 501; a memory MEM 502 of the RAM (random access memory) and/or ROM (read only memory) type, possibly a network module NET 503, for example of the Ethernet type, a storage module STK 504 of the internal storage type and possibly a plurality of radio-frequency modules 505 to 50N according to an IEEE 802.11 standard. The storage module STCK 504 may be of the hard disk HDD (hard disk drive)

or SSD (solid-state drive) type, or of the external storage medium reader type, such as an SD (Secure Digital) card reader. The processor CPU 501 can record data, or information, in the memory MEM 502 or in the storage module STCK 504. The processor CPU 501 can read data recorded in the memory MEM 502 or in the storage module STCK 504. These data may correspond to configuration parameters. The network module NET 504, if present, typically allows connection of the electronic device 500 to a local network and/or internet. Each radio-frequency module 505 to 50N enables the electronic device 500 to establish a plurality of radio-frequency interfaces according to a so-called Wi-Fi standard, for example IEEE 802.11k and/or IEEE 802.11v. A radio-frequency interface may be a Wi-Fi access point, or on the other hand a so-called user radio-frequency interface allowing association with a radio-frequency interface referred to as an access point of another electronic device.

The processor CPU 501 is capable of executing instructions loaded in the memory MEM 502, for example from the storage module STCK 504. When the electronic device 500 is powered up, the processor CPU 501 is capable of reading instructions from the memory MEM 502 and executing them. These instructions form a computer program causing the implementation, by the processor CPU 501, of all or some of the methods and the steps described above, particularly the method described in FIG. 2 or the method described in FIG. 3. Thus all or some of the methods and steps described above may be implemented in software form by the execution of a set of instructions by a programmable machine, such as a DSP (digital signal processor) or a microcontroller. All or some of the methods and steps described here may also be implemented in hardware form by a machine or a dedicated component, such as an FPGA (field-programmable gate array) or an ASIC (application-specific integrated circuit). The functions of the electronic device 500 may be integrated in a node, for example a management and/or gathering node, of a wireless network in accordance with an IEEE 802.11 standard by updating software, that is to say for example by updating the firmware of the electronic device 500.

The invention claimed is:

1. A method for determining eligibility for a handover of a client node of a distributed communication network comprising a plurality of gathering nodes, the client node being connected to a first gathering node, the client node initially being associated with a level equal to 1 among a plurality of levels, said levels being strictly positive natural integers, the method is executed by a management node and comprises the iterative steps of:
   determining a connection quality indicator associated with the client node, the connection quality indicator representing a quality of the connection between the first gathering node and the client node,
   determining a first connection quality threshold according to a level associated with the client node, said first connection quality threshold being higher, the lower the level associated with the client node,
   in response to the connection quality indicator being lower than the first connection quality threshold:
      incrementing the level associated with the client node by adding to the level associated with the client node by a predetermined amount, and
      transferring connection of the client node to a new gathering node after the incrementing, and
   in response to the connection quality indicator being: (1) higher than the first connection quality threshold and (2) higher than a new connection quality threshold equal to a connection quality threshold determined according to a level immediately below the level associated with the client node to which a predefined margin is added:
      decrementing the level associated with the client node by decreasing the level associated with the client node by a predefined amount.

2. The method according to claim 1, wherein the first connection quality threshold and the new connection quality thresholds determined according to the levels associated with a client node constituting an arithmetic or geometric series.

3. The method according to claim 1, two consecutive connection quality thresholds associated with consecutive levels of a client node are determined so that their difference is greater than a variability of the connection quality indicator associated with the client node in a static position.

4. The method according to claim 1, two consecutive connection quality thresholds associated with consecutive levels of a client node are determined so that their difference is greater than four times a variability of the connection quality indicator associated with the client node in a static position.

5. The method according to claim 1, the management node being one of the gathering nodes of the distributed communication network.

6. The method according to claim 1, the communication network being a distributed wireless communication network conforming to an IEEE 802.11 standard.

7. A management node for managing a distributed wireless communication network, the distributed wireless communication network comprising a plurality of gathering nodes, the management node comprising:
   a memory; and
   a processor configured to execute instructions stored in the memory to implement the method according to claim 1.

8. A non transitory storage medium, which can be read by a management node of a distributed wireless communication network, on which a computer program is stored, the computer program comprising instructions for the implementation, by a processor of a management node of a distributed wireless communication network comprising a plurality of gathering nodes, of a method according to claim 1, when the computer program is executed by the program is executed by the processor.

* * * * *